July 5, 1960    R. C. NORRIE    2,943,693
LATCHING MECHANISM FOR TILTING CAB VEHICLE
Filed March 11, 1958    2 Sheets-Sheet 1

INVENTOR.
ROBERT C. NORRIE
BY
*Barnes & Seed*
ATTORNEYS

July 5, 1960    R. C. NORRIE    2,943,693
LATCHING MECHANISM FOR TILTING CAB VEHICLE
Filed March 11, 1958    2 Sheets-Sheet 2
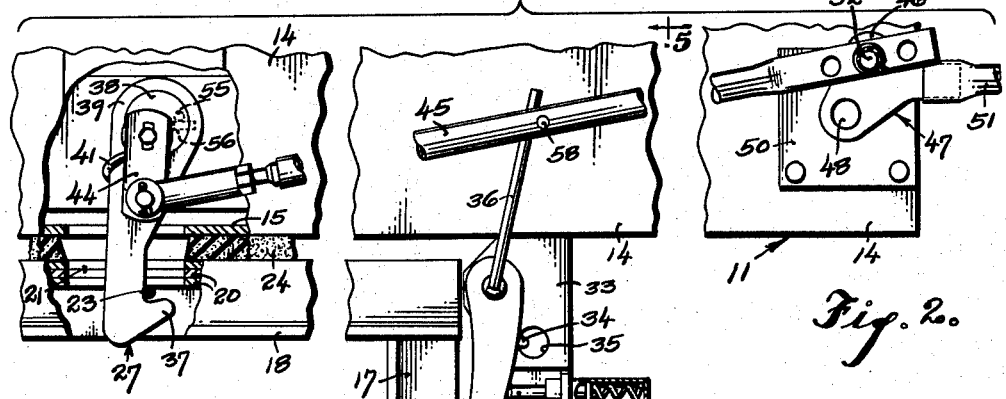
Fig. 2.
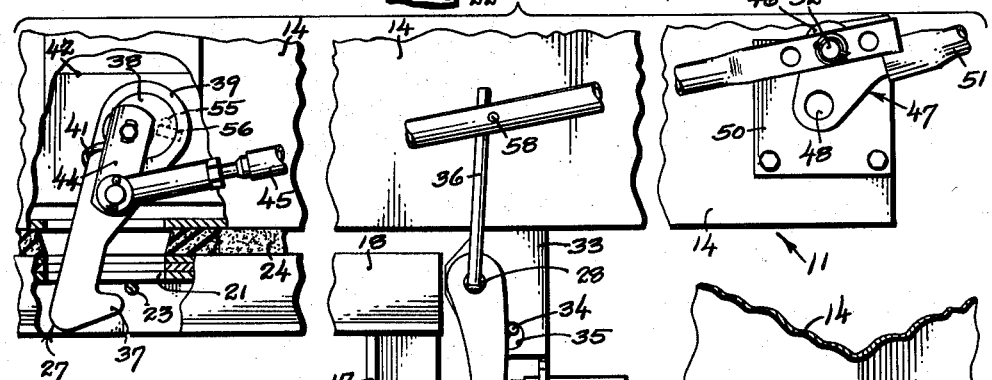
Fig. 3.
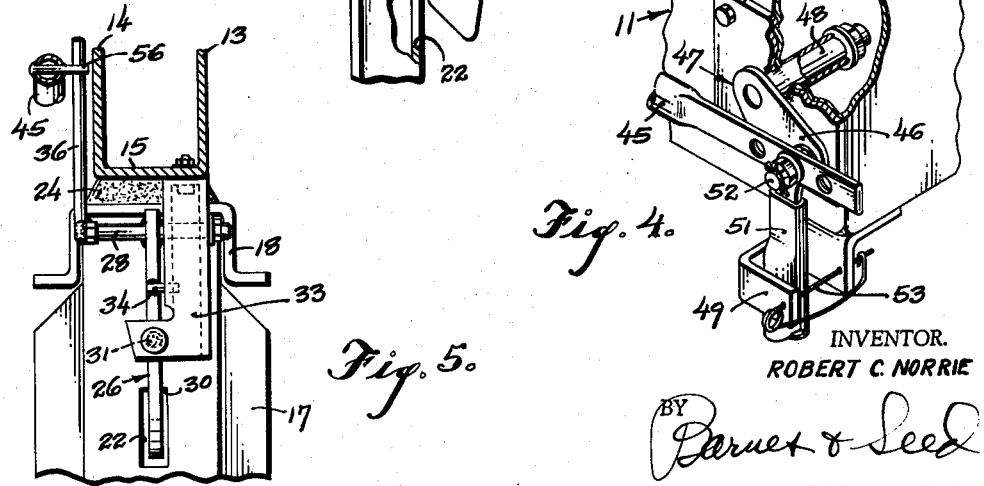
Fig. 4.
Fig. 5.
INVENTOR.
ROBERT C. NORRIE
BY
*Barnes & Seed*
ATTORNEYS ent and adaptation that the following description and claims are intended to be read.

United States Patent Office 2,943,693
Patented July 5, 1960

2,943,693
LATCHING MECHANISM FOR TILTING CAB VEHICLE

Robert C. Norrie, Seattle, Wash., assignor to Pacific Car and Foundry Company, Seattle, Wash., a corporation of Washington Filed Mar. 11, 1958, Ser. No. 720,627

3 Claims. (Cl. 180—89)

This invention relates to tilting-cab motor vehicles, and pertains especially to latch mechanism for releasably securing the cab to the frame of the vehicle chassis when the cab occupies its normal lowered position. The cab which which the present invention is employed is one which tilts forwardly. The latch mechanism is applied to the rear end of the cab and the principal object of the invention is to so engineer such latch mechanism that the same will insure utmost security against liability of becoming accidentally disengaged and yet permit the same to be operated with unusual ease and expedition.

It is a further and particular object to devise a mechanism for the described purpose having two latches, one of which performs a locking function and the other of which may be considered a safety latch, and which is characterized in that both latches are engaged and disengaged by activation of a single operating lever.

As a further object still the invention aims to devise mechanism for the described purpose in which the movement of the locking lever into locking position draws the cab downwardly with a force of considerable magnitude against a moderately compressible pillow, but wherein the responsible force required to be applied to the operating lever is comparatively minor.

The foregoing and other objects and advantages in view will appear and be understood in the following description and claims, the invention consisting in the novel construction and in the adaptation and combination of parts hereinafter described and claimed.

In the accompanying drawings:

Fig. 2 is a fragmentary enlarged-scale rear elevational view of the latching mechanism, with parts broken away and in section, and showing said mechanism at an intermediate point in the mechanism's operating movement.

Fig. 3 is a view similar to Fig. 2 with the two latches shown fully disengaged.

Fig. 4 is a fragmentary perspective view, with parts broken away and in section, to show the handle end of the present mechanism and illustrating the parts in the positions occupied when the two latches are fully engaged.

Fig. 5 is a fragmentary longitudinal vertical sectional view on line 5—5 of Fig. 2.

Figure 1:
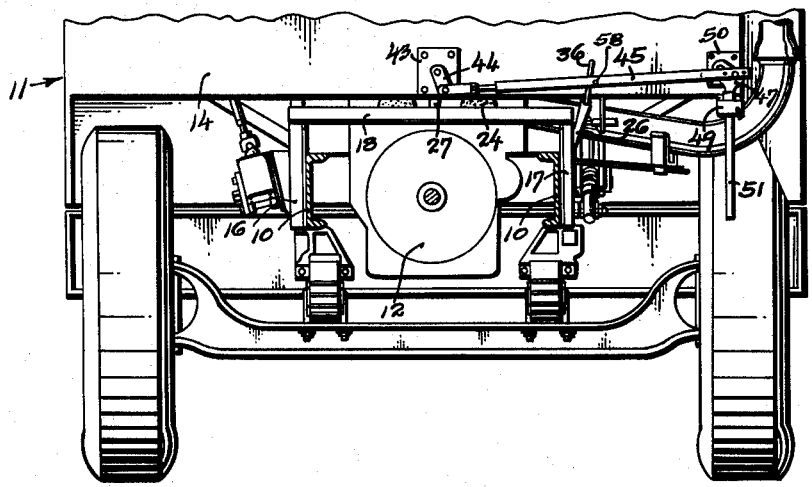
Figure 1 is a transverse vertical sectional view illustrating a tilting-cab vehicle having cab-latching mechanism constructed to embody the preferred teachings of the present invention, the line on which the section is taken being to the immediate rear of the cab and looking forward.
Figure 8:
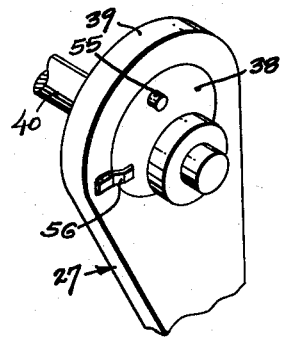
Fig. 8 is a fragmentary perspective detail view of the locking lever and its mounting.
Figure 6:
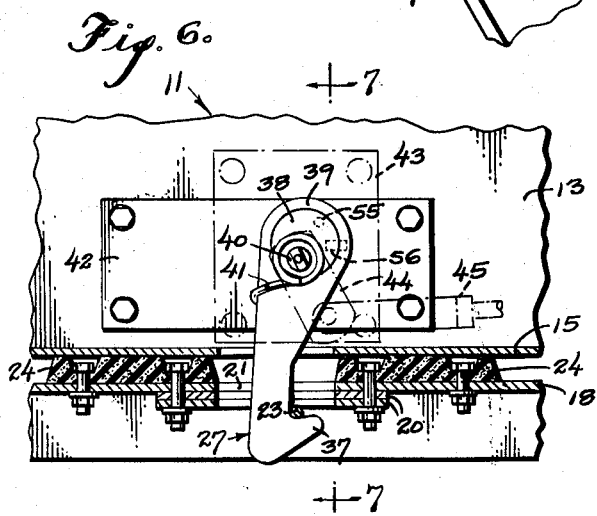
Fig. 6 is a fragmentary rear elevational view of the locking lever, with parts broken away and in section, and showing said lever in the cab-locking position which the same occupies when the operating handle is located as shown in Fig. 4.
Figure 7:
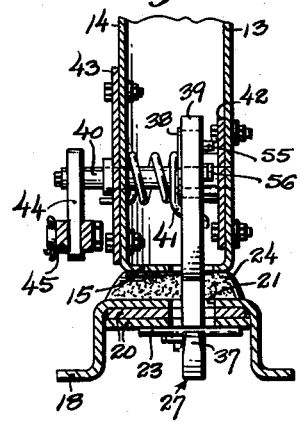
Fig. 7 is a fragmentary longitudinal vertical sectional view on line 7—7 of Fig. 6.

In said drawings the numeral 10 designates the longitudinal principals of a main chassis frame, and 11 denotes a cab fulcrumed for forward tilting movement from a normal lowered position in which the same overlies a vehicle engine 12 into an elevated position giving access to the engine. The cab is or may be a hollow-walled structure and is here illustrated as having a back wall providing separated inner and outer skins 13 and 14, respectively, joined along the bottom by a sill 15. The main frame of the chassis includes an arch extending as a transverse spanner between the two frame principals 10 in a position underlying said sill-piece 15 of the cab so as to support the cab in the lowered position of the latter. I show the arch as being a fabricated structure comprised of side stiles 16 and 17 welded to a headpiece 18 and each composed of channel stock with the central web facing outwardly. The web of the head-piece is centrally reinforced upon its underside by metal plates 20, and there is provided a longitudinal slot 21 extending through both the web and the reinforcing plates. A vertical slot, as 22, is also provided in the web of the side stile 17. A pin 23 extends transversely across the slot 21 below the lower of the two indicated reinforcing plates, with its two ends welded to the plate, and designated by 24 are two pillow blocks of rubber-impregnated fabric or other like or suitable cushioning material bolted or otherwise secured in surmounting relation to the head-piece 18 at opposite sides of the slot. These cushioning blocks are subject to only minor deflection under stress of compression loading.

Two hooked latch elements 26 and 27, both carried by the cab, normally hold the cab in latched relation to the frame arch. The former latch is pivoted by an integral rock shaft 28 for transverse swing movement of its hook terminal 29 about a longitudinal horizontal axis into and out of said vertical slot 22. The slot's head end defines a catch 30 which overlies the hook of such latch 26 when the latch is located within the slot. A spring 31 acting against a plunger 32 which bears upon the back edge of the latch yieldingly urges the hook into the slot 22. A bracket 33 hung from the sill 15 provides a mounting for the spring and plunger as well as producing a journal bearing for the lever-carrying rock shaft 28. A pin 34 is welded to the back edge of the latch and has an end received in an aperture 35 of the bracket 33 to limit the spring-urged travel of the hook when the cab is tilted forwardly to an elevated position. Said latch 26 will be hereinafter referred to as a safety latch and in a manner hereinafter to be described is retracted against the yielding pressure of the spring by an upstanding arm 36 welded to an axial extension of the rock shaft.

The other latch 27, to be hereinafter termed a locking latch, extends downwardly through the slot 21 when the cab is lowered. This latch presents a terminal hook 37 upon the lower end arranged to catch under the pin 23. The head end presents a hub 39, and this hub is freely journaled on the perimeter of a circular cam 38 carried as a fixed eccentric by a shaft 40 journaled for pivotal movement about a longitudinally disposed horizontal axis. A spring 41 yieldingly urges the latch toward the pin 23, the directional swing being counter-clockwise as viewed from the rear of the cab.

The shaft 40 receives its journal mounting from bearing plates 42 and 43 secured to the inner and to the outer skins of the cab's rear wall. An end of the shaft projects rearwardly beyond said plate 43. A flat-sided tongue on this projecting end connects the shaft to a downwardly extending crank arm 44, and attached to this crank arm and extending laterally therefrom is a pitman 45. The outer end of this pitman connects to the power leg 46 of a bell-crank lever 47 fulcrumed, as at 48, to a cab-carried bearing plate 50. The pitman together with the lever 47 and its handle 51 produce a lever toggle joint, with the pin 52 which connects the pitman to the bellcrank lever moving through center from a position as is shown in Fig. 3 to the position represented in Fig. 4. So positioned, the handle is disposed vertically and enters a stall 49 in which it is held by a removable keeper pin 53 (Fig. 4).

When said handle 51 is lifted through somewhat more than a 90° swing from the normal locked position shown in Fig. 4 to the elevated position in which it is represented in Fig. 3, the rocker motion responsively transmitted to the cam shaft 40 by the pitman 45 and the crank arm 44 is clockwise in direction when viewed from the rear of the cab and shifts the crown of the cam through an approximate 45° turn from, say, a "1" to a "2:30" clock reading. During the initial stage of this shift the wristing of the cam within the hub responsively depresses the lever in a degree sufficient to clear the pin 23, following which (see Fig. 2) contact is established from a pin 55, fixed to the face of the cam in a position offset from and paralleling the cam shaft, to a radial finger 56 fixed to the hub of the lever. The cam and the lever thereupon move in concert and back off the hook of the lever from the pin 23 until the same occupies the position shown in Fig. 3, placing the locking latch in a position where it is completely free of the pin and thus permitting the cab to be raised.

A pin 58 fixed to the pitman engages said arm 36 of the safety latch 26 to move said arm forwardly and thus retract the hook 29 of such latch from the vertical slot 22 responsive to the act of lifting the handle 51 out of the stall 49.

When the cab is returned to its normal lowered position and handle 51 is pushed downwardly into the stall, spring 31 asserts its power to press the safety latch into the vertical slot 22, and the counter-clockwise motion of the cam sequentially imparts to the hook of the locking lever (1) a swing motion bringing the hook under the pin 23, and (2) a lift motion forcefully drawing the cab down upon the pillow blocks 24.

It is my intention that no limitations are to be implied and that the hereto annexed claims be given the broades interpretation to which the employed language fairly admits.

What I claim is:

1. In a tilting-cab vehicle, in combination with a vehicle main frame, and a cab pivoted to said frame for forward tilting movement, said cab having a hollow rear wall with a bottom opening giving access to the interior of said hollow wall, said frame providing a bolster underlying said hollow rear wall in a position to be engaged by and support the cab when the cab occupies its normal lowered position, means occupying said hollow center of the cab's rear wall comprising, a pivot shaft carried by the cab for rocker movement about a horizontal axis and having an eccentrically mounted circular cam thereon, a vertically disposed locking latch having its upper end journaled on the cam and on the lower end providing an upwardly facing hook depending below the rear end of the cab, a spring urging said latch about the center of the cam as an axis in one direction of swing movement, manually operated means for turning said shaft through a given arc of rotation in either direction of rocker motion, the eccentric action of the circular cam operating in one direction of said rocker motion to lift the latch and in the opposite direction of such rocker motion to lower the latch, said bolster comprising a channel member having its web uppermost and formed with a slot in said web so disposed as to register with the latch upon said lowering of the cab and permit said hook to protrude into a pocket covered by said web and protected along the sides by the two flanges of the channel, a catch carried by the bolster in a position to traverse said slot and be hooked by the latch of the lowered cab responsive to spring-influenced swing motion of the latch working in concert with a cam-operated lifting of the latch, and means complementary to the cam and acting in the closing stages of the cam's latch-lowering motion for swinging the latch in a direction opposite that influenced by the spring into a position whereat the hook is clear of the catch so as to permit forward tilting of the cab.

2. A tilting-cab vehicle comprising a vehicle main frame, a cab pivoted thereto for forward tilting movement, two hold-down connections each comprising a latch and a complementing catch with one complement of each connection carried by the cab and the other complement carried by the frame, both of said latches being hook latches vertically disposed and one being a safety latch mounted for simple swing action and the other being a locking latch mounted for compound swing and lift action, a spring yieldingly urging the safety latch into hooking engagement with its catch, and a manually operable means for moving the locking latch into and out of engagement with its catch and acting automatically to disengage the safety latch against the yielding force of said spring simultaneously with the disengagement of the locking latch, said manually operable means including a rod movable in a direction generally endwise to its axis, the safety latch being formed as a lever fulcrumed intermediate its ends with the hooking element formed at the free end of one lever arm and having the other lever arm engaged by a pin carried by said rod.

3. Structure according to claim 2 in which the endwise motion is transmitted to the rod by means of a hand-operated crank arm having an over-center connection with the rod so as to produce a substantial toggle joint.

References Cited in the file of this patent

UNITED STATES PATENTS

| | | |
|---|---|---|
| 2,246,792 | Dall | June 24, 1941 |
| 2,378,654 | Pekny | June 19, 1945 |
| 2,672,942 | Bayley | Mar. 23, 1954 |
| 2,740,487 | Murty et al. | Apr. 3, 1956 |
| 2,864,121 | Imber et al. | Dec. 16, 1958 |

OTHER REFERENCES

Automotive Industries, August 1, 1954, Page 68.